United States Patent
Fenk

(10) Patent No.: US 7,196,535 B2
(45) Date of Patent: Mar. 27, 2007

(54) THERMAL CONTROL SYSTEM FOR ENVIRONMENTAL TEST CHAMBER

(75) Inventor: C. Walter Fenk, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 422 days.

(21) Appl. No.: 10/831,875

(22) Filed: Apr. 26, 2004

(65) Prior Publication Data

US 2005/0267645 A1    Dec. 1, 2005

(51) Int. Cl.
G01R 31/02 (2006.01)

(52) U.S. Cl. ................................ 324/765; 324/760

(58) Field of Classification Search ............ 324/760, 324/765; 374/100; 165/80.3
See application file for complete search history.

(56) References Cited

U.S. PATENT DOCUMENTS

| | | | | |
|---|---|---|---|---|
| 4,609,037 A * | 9/1986 | Wheeler et al. | ............... | 165/61 |
| 4,787,752 A * | 11/1988 | Fraser et al. | .................. | 374/45 |
| 5,290,381 A * | 3/1994 | Nozawa et al. | ........ | 156/345.27 |
| 5,582,235 A * | 12/1996 | Hamilton et al. | ........... | 165/263 |
| 5,603,570 A * | 2/1997 | Shimizu | ..................... | 374/100 |
| 5,859,408 A * | 1/1999 | Baxendine | .................. | 219/390 |
| 6,184,504 B1 * | 2/2001 | Cardella | ..................... | 219/513 |
| 6,415,858 B1 * | 7/2002 | Getchel et al. | ............. | 165/206 |
| 6,476,627 B1 * | 11/2002 | Pelissier et al. | ............ | 324/760 |
| 6,593,761 B1 * | 7/2003 | Fukasawa et al. | .......... | 324/754 |
| 6,711,961 B2 * | 3/2004 | Theriault et al. | .......... | 73/865.6 |
| 6,825,681 B2 * | 11/2004 | Feder et al. | ................ | 324/760 |
| 2002/0014894 A1 * | 2/2002 | Yonezawa et al. | .......... | 324/760 |

* cited by examiner

Primary Examiner—Ha Tran Nguyen
Assistant Examiner—Arleen M. Vazquez
(74) Attorney, Agent, or Firm—Buckley, Maschoff & Talwalkar LLC

(57) ABSTRACT

A method includes setting a first target temperature for an object that is in contact with a thermal medium, repeatedly receiving input that is indicative of a current temperature of the thermal medium, repeatedly estimating the temperature of the object based on the input, repeatedly setting a second target temperature for the thermal medium based on the estimated temperature of the object, and controlling the temperature of the thermal medium based on the second target temperature which has been set. Other embodiments are described and claimed.

15 Claims, 6 Drawing Sheets

THERMAL CONTROL SYSTEM FOR ENVIRONMENTAL TEST CHAMBER

BACKGROUND

Environmental test chambers are used by designers and manufacturers of printed circuit boards (e.g., boards with electronic components mounted thereon) to subject the circuit boards to thermal cycling so as to determine whether the circuit boards are able to withstand thermal stresses that the circuit boards may encounter during use. Typically, an automatic controller is interfaced to the environmental test chamber to control heating and/or cooling of the air (or other fluid) inside the chamber so that circuit boards placed in the chamber are subjected to the desired thermal testing regimen. Often thermal testing of circuit boards requires a period of days or weeks as the circuit boards are subjected to numerous cycles in which the boards are brought up or down to a desired "soak" temperature, maintained at that temperature for a specified period, and then "soaked" at another temperature. It would be desirable to reduce the time required for thermal testing of circuit boards.

DETAILED DESCRIPTION

Figure 1:
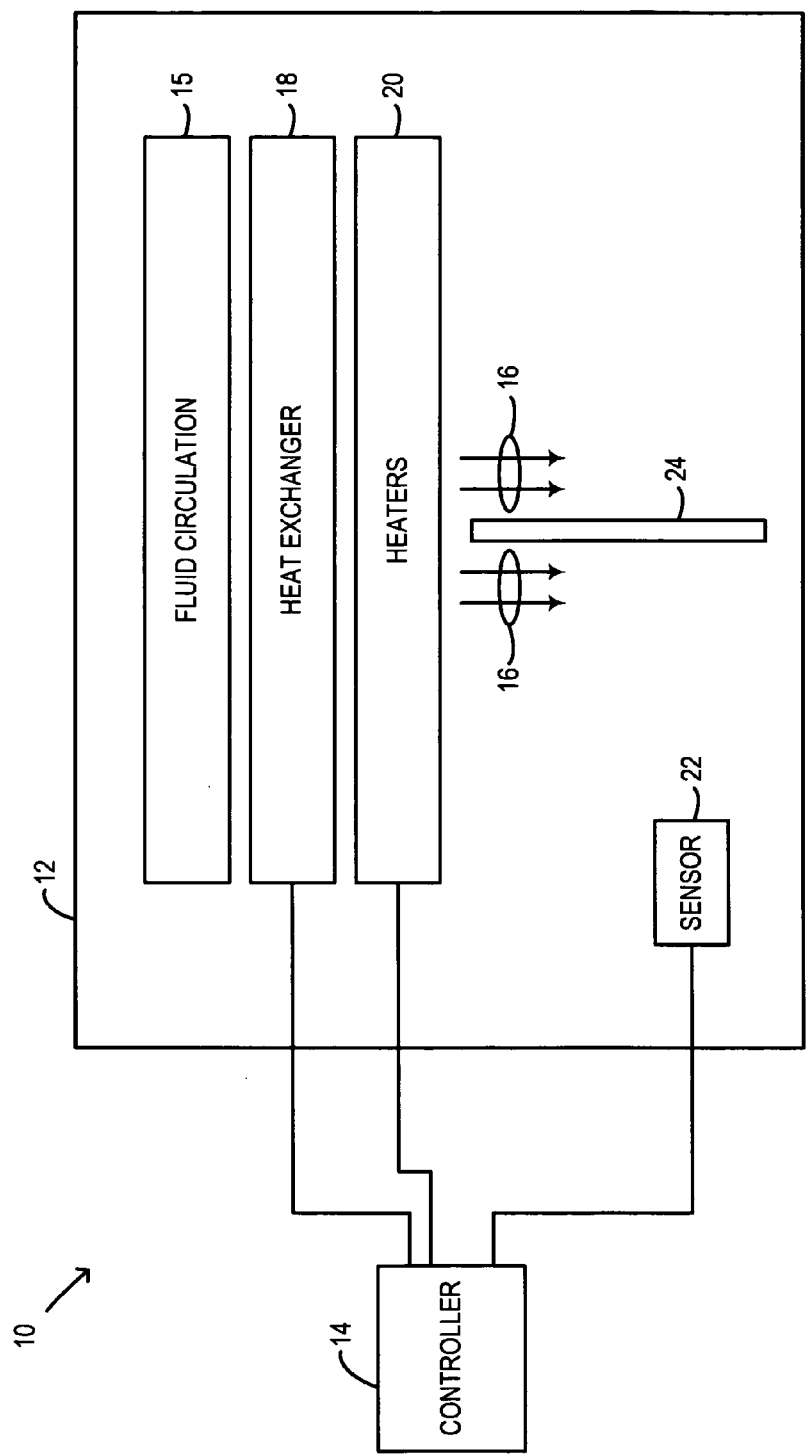
FIG. 1 is block diagram of a thermal testing system according to some embodiments.

FIG. 1 is a block diagram of a thermal testing system 10 according to some embodiments. In its hardware aspects, the thermal testing system 10 may, but need not, be constituted entirely of conventional components.

The thermal testing system 10 includes a chamber 12 and a controller 14. The thermal testing system 10 further includes a fluid circulation component 15 which causes a fluid (e.g., air or gaseous nitrogen, enclosed within the chamber) to circulate in the chamber 12 as schematically indicated, for example, by arrows 16.

The thermal testing system 10 also includes a heat exchanger 18 which may be located in or adjacent to the chamber 12 to selectively cool the fluid that circulates through the chamber 12. The heat exchanger 18 is coupled to the controller 14 and operates under the control of signals output from the controller 14.

Also included in the thermal testing system 10 are one or more electric heaters 20. The heaters 20 may be located in or adjacent to the chamber 12 to selectively heat the fluid that circulates through the chamber 12. The heaters 20 are coupled to the controller 14 and operate under the control of signals output from the controller 14.

It will be understood that the heat exchanger 18 and the heaters 20 are examples of one or more temperature control elements that may be associated with the chamber 12 to selectively change the temperature of the fluid that is in or circulates to or through the chamber 12, where the temperature control elements operate under the control of the controller 14.

In addition, the thermal testing system 10 includes a sensor 22 located in the chamber 12, or otherwise exposed to the circulating fluid. The sensor 22 is coupled to the controller 14 and provides a sequence of signals to the controller 14 to indicate the current temperature of the fluid in the chamber 12.

An object 24 is shown located in the chamber 12 for thermal testing therein. The object 24 may be, for example, a circuit board, with or without components mounted thereon. Although only one object 24 is shown in the drawing, in practice a considerable number of objects may be placed in the chamber 12 at one time for testing in a single batch. In some embodiments, if the object is a circuit board or circuit board assembly or the like, it may be vertically oriented and the fluid may be circulated so as to be forced vertically downward parallel to the object.

Figure 2:
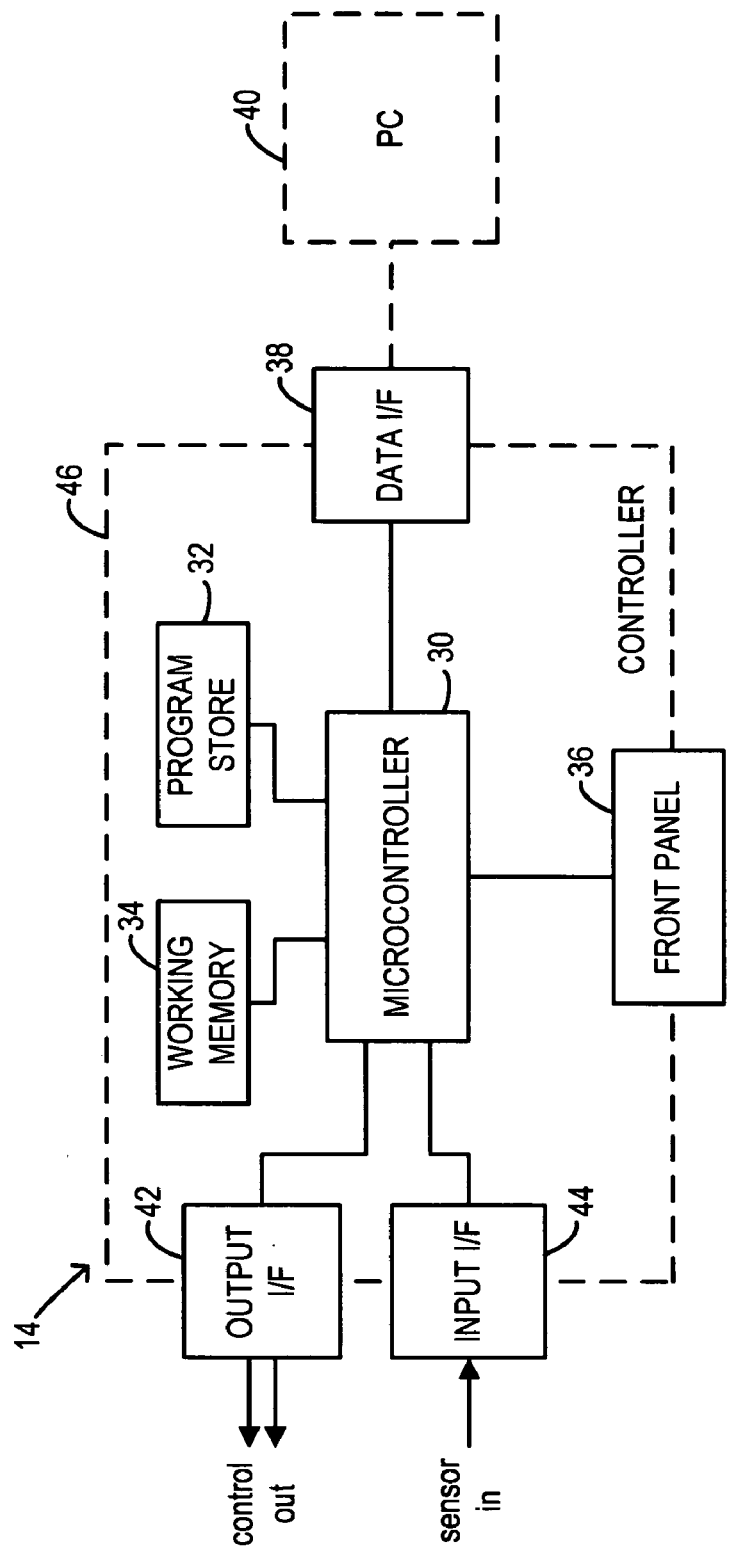
FIG. 2 is a block diagram that shows some details of a controller that is part of the thermal testing system of FIG. 1.

As noted above, the controller 14 may be embodied with conventional hardware (e.g., as a device such as a standard environmental test chamber controller available from Thermotron Industries, Holland, Michigan or the model F4 controller available from Watlow Electric Manufacturing Co., St. Louis, Mo.), but programmed to perform the process or processes described hereinbelow. FIG. 2 is a block diagram that shows details of a suitable embodiment of the controller 14.

As seen from FIG. 2, the controller 14 may include a microcontroller 30, or other programmable control device, which generally operates under the control of a stored program and which controls operation of the controller 14 and thus controls at least a portion of the operation of the thermal testing system 10.

The controller 14 may also include a program store 32 (e.g., ROM (read only memory) and/or flash memory) which is coupled to the microcontroller 30 and stores the program that controls operation of the microcontroller 30. The controller 14 may further include working memory 34 such as RAM (read only memory) that is coupled to the microcontroller for temporary data storage.

There may also be included in the controller 14 a front panel 36 that is coupled to the microcontroller 30 to allow a user to provide input to the controller 14 and/or to receive output indications of the operation of the controller, to receive prompts, etc.

The controller 14 may also include a data interface 38 (e.g., an RS232 or RS485 interface or an Ethernet interface) that is coupled to the microcontroller 30 to allow the microcontroller to be connected for data communication with an external data processing device such as a personal computer 40 (shown in phantom). The personal computer 40 may be programmed to allow a user to communicate with the microcontroller 30 via the personal computer 40 so that the user may use the user interface of the personal computer to provide input to the controller 14.

Furthermore, the controller 14 may include an output interface 42 and an input interface 44, both coupled to the microcontroller 30. The output interface 42 may include a digital-to-analog conversion capability (not separately shown) to convert digital output signals from the microcontroller 30 to analog control signals to be provided to the heat exchanger 18 and/or to the heaters 20. The input interface 44 may include an analog-to-digital conversion capability (not separately shown) to convert analog sensor signals from the sensor 22 into digital input signals for the microcontroller 30.

The controller 14 may also include a housing 46 (shown in phantom) in or on which all of the other components of the controller 14 may be mounted.

Figure 3:
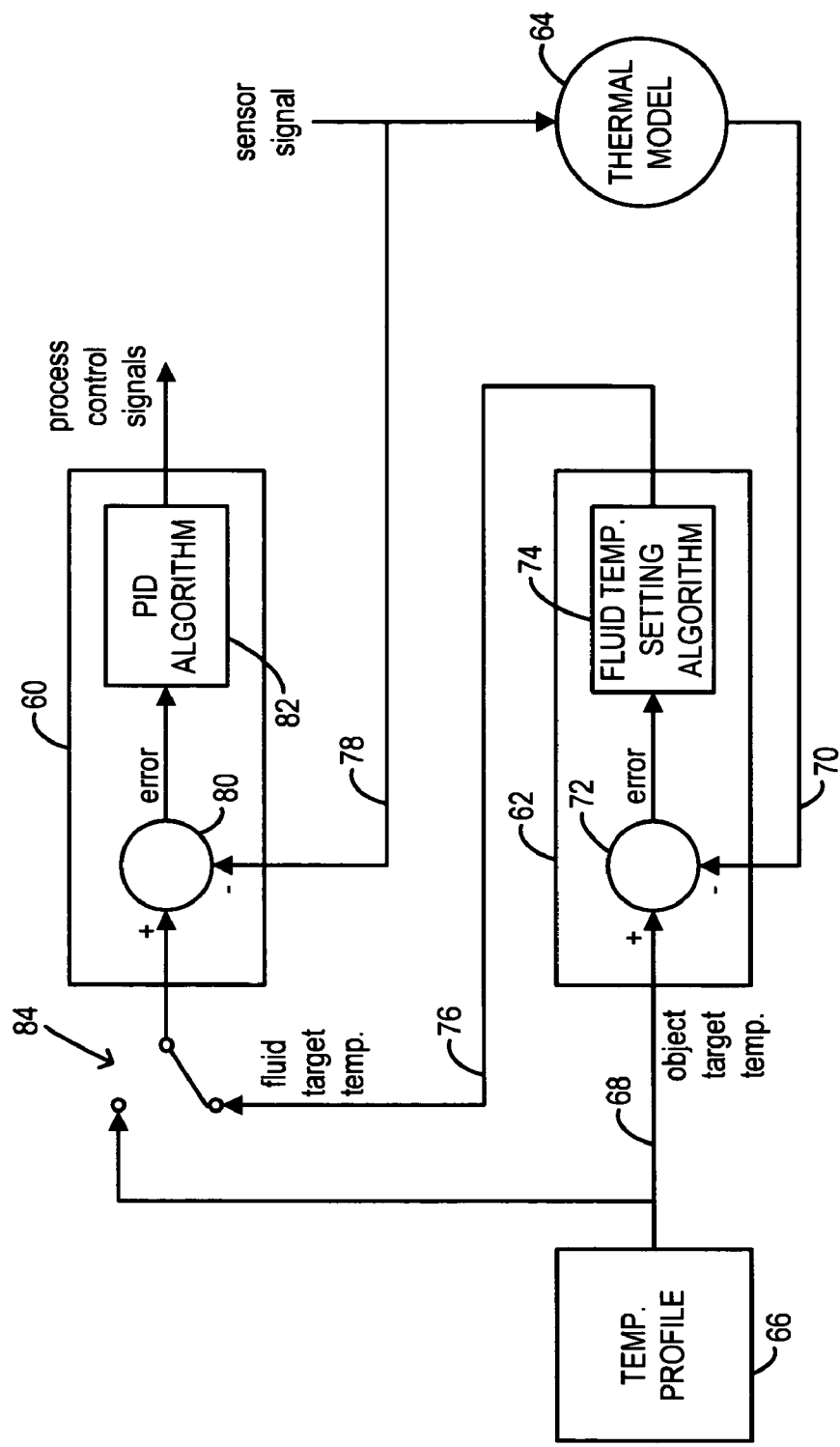
FIG. 3 is a functional block diagram illustration of a control process implemented in the controller of FIG. 2 according to some embodiments.

FIG. 3 is a functional block diagram illustration of a control process implemented in the controller 14 according to some embodiments.

The control process illustrated in FIG. 3 may be considered to have four main components: (1) a fluid temperature control function 60; (2) a virtual object temperature control function 62; (3) a model 64 of a process by which heat is exchanged between the object 24 (FIG. 1) and the fluid circulating in the chamber 12; and (4) a target object temperature profile 66.

The target object temperature profile 66 provides as an output a target object temperature. For example, the "target object temperature" may be a temperature at which the object is to be "soaked" for a predetermined period of time. The target object temperature output from the profile 66 may vary over time to implement a predetermined sequence of thermal testing cycles. For example, in one embodiment, each cycle may include a "soak" at a low temperature (e.g. −25° C.) followed by a soak at a high temperature (e.g., +105° C.), and the number of cycles in a thermal testing regimen may be in the hundreds or thousands for some types of testing, or only one to 20 cycles for other types of testing. In accordance with conventional practices, each cycle may be performed immediately after a preceding cycle. To obtain a soak of, say, 8 minutes at a target temperature, the profile 66 may set the target object temperature to the desired value for (8+X) minutes, where X equals the expected amount of time required to change the surface temperature of the object from a previous target temperature to the next target temperature.

The sequence of target temperatures generated by the profile 66 may reflect testing regimen parameters (e.g., low temperature, high temperature, soak times, number of cycles) input to the controller 14 by a user.

The model 64 receives as its input a sequence of signals from the sensor 22 which indicate the current temperature of the fluid circulating in the chamber 12. Based on the sequence of sensor signals, and possibly also based on an initial temperature of the object 24, the model 64 outputs a sequence of estimates of the current temperature of the object 24. The initial temperature of the object may be a parameter input to the controller 14 by the user, or may reflect a temperature at which the object has been soaking.

In a case where the object is a generally planar circuit board, the model 64 may be based on the following.

Steady State Model

A forced convection heat transport model for fluid flow parallel to a plane surface may be applicable.

The Reynolds number Re may be calculated as=(fluid density)*(fluid free stream velocity)*(object dimension perpendicular to fluid flow)/(fluid viscosity).

The Prandtl number Pr may be calculated as=(fluid specific heat)*(fluid viscosity)/(fluid thermal conductivity).

The Nussult number Nu may be calculated as=0.664*(Pr)$^{1/3}$*(Re)$^{1/2}$.

Based on the above, the heat transfer coefficient h for the object may be calculated as=(fluid thermal conductivity)*(Nu)/(object dimension parallel to fluid flow).

Newton's law of cooling can be applied to provide an expression for the quantity Q of heat transferred between the object surface and the surrounding fluid, with Q=h*(object surface area)*(difference between object surface temperature and fluid temperature). The foregoing equation can be solved to determine the object surface temperature based on the Q at the previous known state of the system, h, the area of the object (i.e., area of main surface, assumed to be area parallel to fluid flow) and current fluid temperature to determine the steady state object surface temperature.

A simpler or a more complex thermal model than that described in the foregoing paragraphs may be employed in some embodiments. For example, a more complex model may also take into account factors such as the specific heat of the object and/or the heat conductivity of the object.

Dynamic Model

To reflect the fact that the fluid temperature is, at times, changing, and that at those times the object surface temperature is asymptotically approaching the fluid temperature, a function like $1-e^{exp}$ may be employed to determine the estimated object temperature for each time increment, where exp=(Δt)*Q*(TC)*(maximum temperature change per steady state condition), and TC is the time constant.

In connection with this model, the user may be prompted to input parameters such as object dimensions parallel and perpendicular to fluid flow, fluid free stream velocity, fluid viscosity, fluid density, fluid specific heat, fluid thermal conductivity and thermal diffusivity. In some embodiments, some of these parameters may effectively be input by the user identifying the fluid (e.g., identifying the fluid as air, indicating the elevation at which the system is installed).

It will be appreciated that other heat exchange models may be employed, e.g., in cases where the shape of the object is not planar and/or if it is desired to control the temperature inside the object.

The virtual object temperature control function 62 receives as one input (as indicated at 68) the current target object temperature from the target object temperature profile 66. The target object temperature serves as a virtual setpoint for the virtual object temperature control function 62. As another input (indicated at 70), the virtual object temperature control function 62 receives the current estimated object temperature output from the model 64. As part of the virtual object temperature control function 62, a comparator 72 generates an error signal that is equal to the difference between the two inputs. The error signal is provided as an input to a target fluid temperature setting algorithm 74. The target fluid temperature setting algorithm may, in some embodiments, set the target fluid temperature at a maximum allowable fluid temperature when the error signal is positive and has a magnitude greater than a pre-determined amount, and may adjust the target fluid temperature toward the target object temperature (e.g., via a ramp function) when the error signal is positive and has a magnitude less than or equal to the pre-determined amount. When the error signal is negative and has a magnitude greater than a pre-determined amount, the target fluid temperature setting algorithm may set the target fluid temperature at a minimum allowable fluid temperature. When the error signal is negative and has a magnitude less than a pre-determined amount, the target fluid temperature setting algorithm may adjust the target fluid temperature toward the target object temperature (e.g., via a ramp function).

The maximum and minimum allowable fluid temperatures may be parameters that are settable by input from the user, and may be, respectively, somewhat higher than the desired high soak temperature and somewhat lower than the desired low soak temperature to speed the convergence of the object temperature to the target soak temperatures. These maximum and minimum allowable fluid temperatures may be selected, for example, according to the degree of uncertainty in the sensor output and/or in the functioning of the model 64.

In other embodiments, a more complex target fluid temperature setting algorithm, such as a PID (proportional, integral, derivative) function, may be employed to minimize or eliminate object temperature overshoot and to optimize convergence of the object temperature to the target object temperature.

In any case, the virtual object temperature control function 62 provides as an output a target fluid temperature that is based on the estimated object temperature output from the model 64 and is based on the target object temperature from the profile 66.

The fluid temperature control function 60 receives as one input (as indicated at 76) the target fluid temperature output from the virtual object temperature control function 62. The target fluid temperature serves as a setpoint for the fluid temperature control function 60. As another input (indicated at 78), the fluid temperature control function 60 receives the sensor signal which indicates the current temperature of the fluid circulating in the chamber 12. As part of the fluid temperature control function 60, a comparator 80 generates an error signal that is equal to the difference between the two inputs. The error signal is provided as an input to a PID algorithm 82 (although other types of algorithms, such as so-called "fuzzy logic", may be used).

In some embodiments, the fluid temperature control function 60 may operate in essentially the same manner as a conventional environmental test chamber temperature control, except that the setpoint for the control function 60 is, at least some of the time, the varying target fluid temperature output from the other control function 62, rather than a setpoint directly from a temperature profile or a setpoint that is input by a user, as in conventional environmental test chamber control systems.

In some embodiments, the fluid temperature control function 60 outputs a control signal to operate the electric heating elements 20 (FIG. 1) when the error signal from the comparator 80 is positive, and outputs a control signal to operate the heat exchanger 18 when the error signal from the comparator 80 is negative.

In some embodiments, as indicated at 84 in FIG. 3, the setpoint for the fluid temperature control function 60 may be switchable between the target fluid temperature output from the virtual object temperature control function 62 and the target object temperature output directly from the temperature profile 66. For example, the setpoint for the fluid temperature control function 60 may be the target fluid temperature from the virtual object temperature control function 62 except when the estimated object temperature is at or very close to the target object temperature. At such times, the use of the target object temperature as the setpoint for the fluid temperature control function may more accurately maintain the object at the soak temperature once the soak temperature has been reached by the object.

Figure 4A:
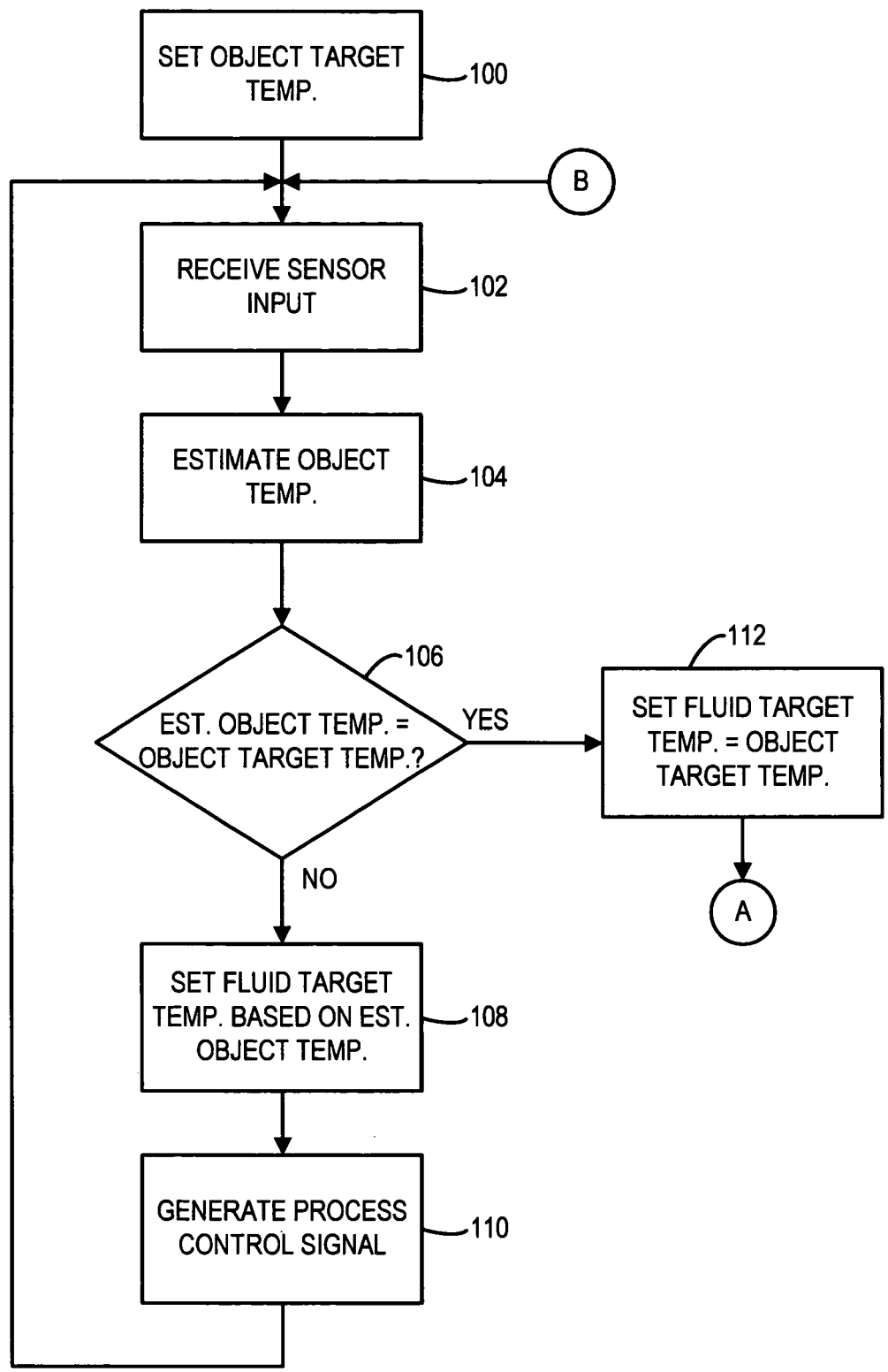
FIGS. 4A and 4B together form a flow chart that further illustrates the control process of FIG. 3.
Figure 4B:
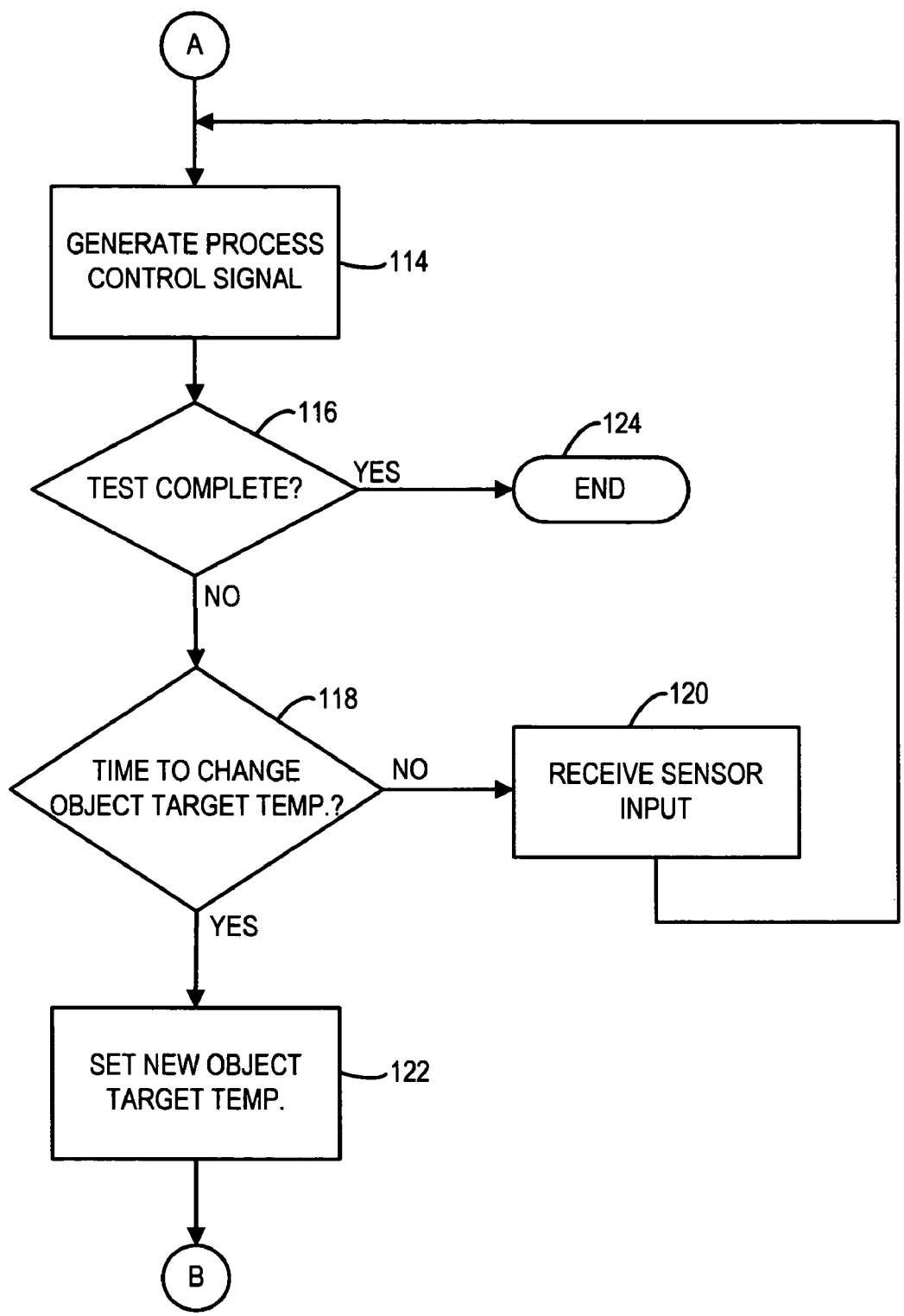

FIGS. 4A and 4B together form a flow chart that further illustrates the control process of FIG. 3.

It will be assumed that the user has input into the controller 14 all required parameters, including testing regimen definition (e.g., low and high temperatures, soak durations and number of cycles), parameters required for the object-fluid heat exchange model, and maximum and minimum allowable fluid temperatures (if required). Then, as the testing regimen commences, the temperature profile 66 (FIG. 3) sets the initial target object temperature, as indicated at 100 in FIG. 4A. As indicated at 102, the controller 14 receives from the sensor 22 input that indicates the current temperature of the fluid circulating in the chamber 12. As indicated at 104, the model 64 estimates the temperature (e.g., the surface temperature) of the object 24 in the chamber 12, based at least in part on the input from the sensor 22. Then, as indicated at 106, it is determined whether the estimated object temperature has reached the target object temperature. If not, then the target fluid temperature is set (as indicated at 108) by the virtual object temperature control function 62 based on the estimated object temperature from the model 64 and based on the target object temperature set at 100 by the profile 66. As indicated at 110, based on the target fluid temperature set at 108 and based on the input from the sensor 22, the fluid temperature control function 60 generates a control signal, when appropriate, to either the heaters 20 (if heating of the fluid is indicated to be necessary) or to the heat exchanger 18 (if cooling of the fluid is indicated to be necessary). Thus the temperature of the fluid circulating in the chamber 12 is controlled based on the target fluid temperature set at 108. The process then loops back to 102, and the loop of 102–110 repeats until it is determined at an instance of 106 that the estimated object temperature has reached (or in some embodiments, come close to) the target object temperature.

When a positive determination occurs at 106 (i.e., when it is determined that the estimated object temperature has reached the target object temperature) then, as indicated at 112, the setpoint for the fluid temperature control function 60 (FIG. 3) is switched from the target fluid temperature generated by the virtual object temperature control function 62 to the target object temperature obtained directly from the profile 66. Then, as indicated at 114 (FIG. 4B), the fluid temperature control function 60 generates a control signal as in 110, except that the source of the setpoint for the fluid temperature control function has in effect been changed. It is then determined, at 116, whether the test regimen has been completed. If not, it is next determined, at 118, whether the profile 66 (FIG. 3) indicates that it is time to change the target object temperature. If not, the next sensor input signal is received, as indicated at 120, and the process loops back to 114, and the loop 114–120 is repeated until either the test is complete or the target object temperature (i.e., the setpoint for the virtual object temperature control function 62) is changed by the profile 66.

If the target object temperature is changed (i.e., it is time for the next leg of the current cycle or for the next cycle), then the setpoint for the virtual object temperature control function 62 is switched back to the output of the profile 66 and is set to the next target object temperature prescribed by the profile, as indicated at 122 in FIG. 4B. The process then returns to the loop 102–110 (FIG. 4A), which was described above, and continues in that loop until a positive determination is made at 106.

Considering again the decision at 116 (FIG. 4B), if it is time for the test regimen to end (i.e., if the last cycle of the regimen has been performed), then the process ends, as indicated at 124 in FIG. 4B.

Figure 5:
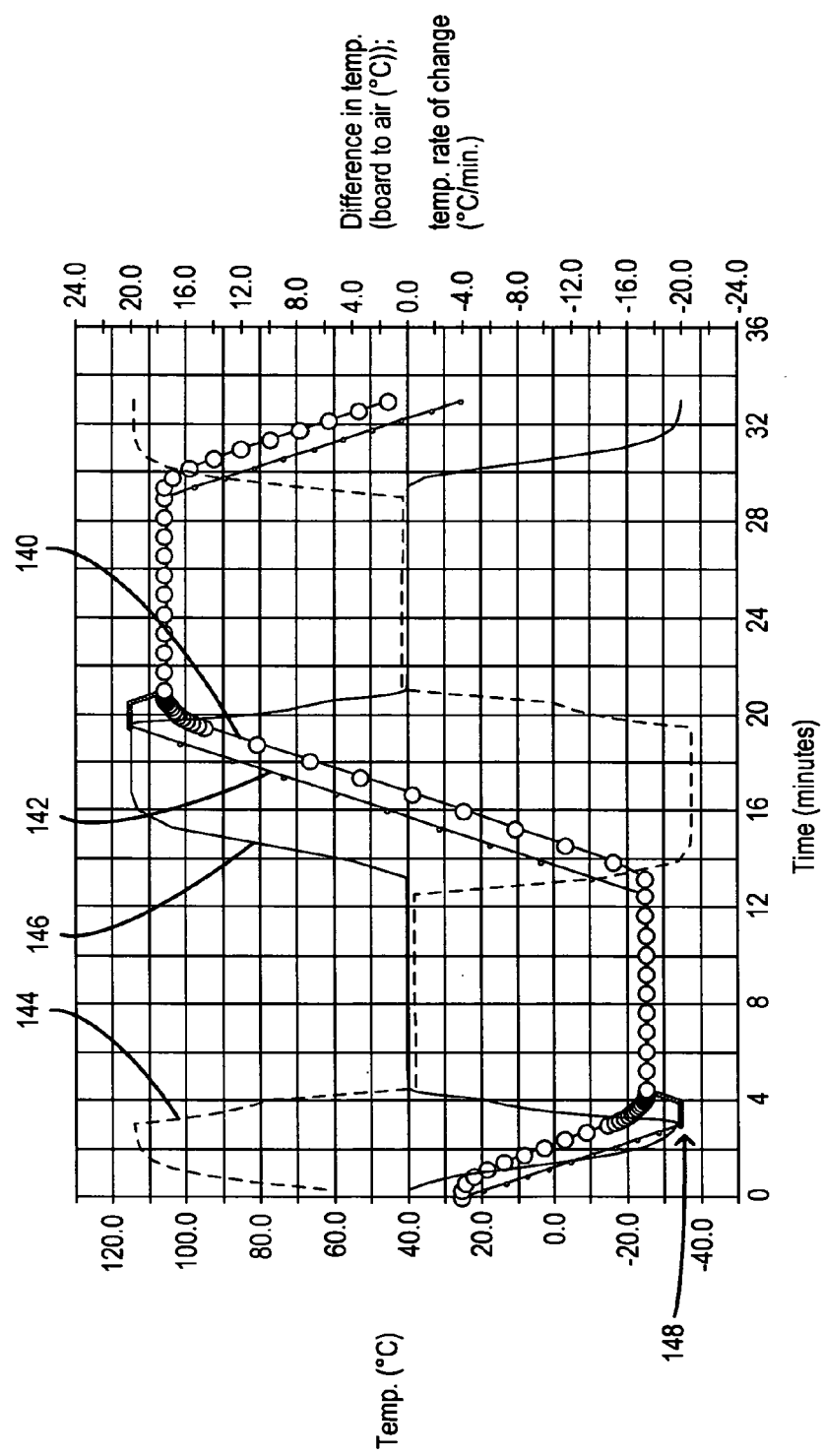
FIG. 5 is a graph that illustrates a simulated example of the control process of FIGS. 3, 4A and 4B.

FIG. 5 is a graph that illustrates a simulated example of the control process of FIGS. 3, 4A and 4B. In particular, the simulated data graphed in FIG. 5 illustrates approximately one cycle (e.g., the first cycle) of a thermal testing regimen according to some embodiments.

In FIG. 5, trace 140 (the trace with the relatively large circles) indicates the estimated temperature (e.g., the surface temperature) of the object. Trace 142 (the trace with the relatively small circles) indicates the temperature of the fluid which is circulating in the chamber. These two traces are read with reference to the left-hand vertical axis, which is scaled in ° C. from −50.0 to +130.0.

The dashed line trace 144 indicates the difference in temperature between the estimated object temperature and the fluid temperature, and is read with reference to the right-hand vertical axis, interpreted as scaled in ° C. The plain line trace 146 indicates the rate of change in the estimated object temperature, and is read with reference to the right-hand vertical axis, interpreted as scaled in ° C./min.

The simulated example shown in FIG. 5 assumes that the designed soak temperature for the first leg of the cycle is −25° C. To help to cause the object temperature to reach this target quickly, the virtual object temperature control function 62 (FIG. 2) may set the target fluid temperature (the set point for the fluid temperature control function 60) to the lowest allowable fluid temperature, assumed for this example to be about −35° C. As a result, the fluid temperature in the chamber is lowered as quickly as possible to −35° C. and is maintained there, as indicated at 148 in FIG. 5, until the estimated object temperature has closely approached the desired soak temperature, at which point the fluid temperature is raised to the desired soak temperature.

In accordance with typical criteria, the soak period may be considered to begin when the rate of change in the object surface temperature is less than 1° C./min. and the difference between the object surface temperature and the desired soak temperature is less than 1° C.

An effective fluid temperature profile as shown by trace 142 in FIG. 5 may bring the object to the desired soak temperature more quickly than a conventional fluid temperature profile, in which the fluid temperature is not lowered below the desired soak temperature. In such a conventional fluid temperature profile, there may be an extended period during which the object temperature is asymptotically approaching but does not yet reach the desired soak temperature. With the fluid temperature profile shown by trace 142 in FIG. 5, on the other hand, the time for the object to reach the soak temperature may be substantially reduced, so that the over-all cycle time, and the over-all duration of the thermal testing regimen, may be substantially shortened.

An additional advantage is that the process of FIGS. 3–4B does not require that a temperature sensor be attached to the object under test.

In some embodiments, the process of FIGS. 3–4B may be applied to a test regimen in which thermal stratification testing (an example of which is described in co-pending U.S. patent application entitled "Thermal Stratification Test Apparatus and Method Providing Cyclical and Steady-state Stratified Environments", which has a common inventor and common assignee herewith) is employed. Thus, for example, if the objects to be thermal tested are circuit boards, the objects may be horizontally oriented, or otherwise oriented other than vertically.

In some applications, such as the thermal stratification testing referred to above, air or other gas within the chamber need not be the thermal medium, or the sole thermal medium, by which heat is transferred to or from the object to be tested. For example, in some embodiments, the object to be tested may be heated and/or cooled via a plate that is thermally coupled to the object by a solid, pliable thermal interface medium that is thermally conductive and electrically non-conductive. In such a case, the model 64 may be a simple conduction model. In other embodiments, one or more thermal chucks may serve as a thermal medium.

In some embodiments, a process like that illustrated in FIGS. 3–4B may be applied to thermal testing of other items (e.g., FCBGAs (flip chip ball grid assemblies), integrated circuit packages, electronic components) in addition to or instead of circuit boards. Moreover, the process of FIGS. 3–4B may be applied to temperature control in other types of devices besides environmental test chambers. Such other devices may include, for example, industrial or cooking ovens, solder reflow ovens, sterilization ovens, and chemical reaction chambers and/or vessels.

As used herein and in the appended claims, "thermal medium" refers to any object, material, substance, liquid and/or gas that is in contact with an object to be tested to transfer heat to or from the object to be tested.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   setting a target object temperature for an object that is in contact with a fluid thermal medium;
   receiving input indicative of a current temperature of the fluid thermal medium;
   estimating a temperature of the object based on the input;
   setting a target fluid temperature for the fluid thermal medium based on the estimated temperature of the object and on the target object temperature; and
   controlling the temperature of the fluid thermal medium based on the set target fluid temperature;
   wherein the setting includes:
   during a first time period in which the estimated temperature of the object is less than the current temperature of the fluid thermal medium, setting the target fluid temperature higher than the target object temperature; and
   during a second time period in which the estimated temperature of the object is substantially equal to the current temperature of the fluid thermal medium, setting the target fluid temperature substantially equal to the target object temperature.

2. The method of claim 1, wherein the object is a circuit board.

3. The method of claim 1 wherein the fluid thermal medium includes gaseous nitrogen.

4. The method of claim 3, wherein the fluid thermal medium is air.

5. The method of claim 1, wherein the controlling includes at least one of: (a) heating the fluid thermal medium with at least one electric heater and (b) cooling the fluid thermal medium with a heat exchanger.

6. The method of claim 1, wherein the controlling includes performing a PID (proportional, integral, derivative) control algorithm using the target fluid temperature and the current temperature of the thermal medium as inputs.

7. The method of claim 1 wherein the setting of the target fluid temperature includes performing a PID control algorithm using the target object temperature and the estimated temperature of the object as inputs.

8. The method of claim 1, wherein the estimating uses a model of a process by which heat is exchanged between the fluid thermal medium and the object.

9. An apparatus comprising:
   a chamber enclosing a fluid thermal medium;
   a sensor in the chamber for indicating a current temperature of the fluid thermal medium;
   at least one temperature control element associated with the chamber for selectively changing a temperature of the fluid thermal medium; and a controller coupled to the sensor and to the at least one temperature control element and programmed to:
receive a target object temperature for an object in the chamber;
receive sensor signals from the sensor;
estimate a temperature of the object based on the sensor signals;
set a target fluid temperature for the fluid thermal medium based on the estimated temperature of the object; and
control the at least one temperature control element to adjust the temperature of the fluid thermal medium in accordance with the target fluid temperature;
wherein:
during a first time period in which the estimated temperature of the object is less than the current temperature of the fluid thermal medium, the controller sets the target fluid temperature higher than the target object temperature; and
during a second time period in which the estimated temperature of the object is substantially equal to the current temperature of the fluid thermal medium, the controller sets the target fluid temperature substantially equal to the target object temperature.

10. The apparatus of claim 9, wherein the at least one temperature control element includes at least one electric heater and a heat exchanger.

11. The apparatus of claim 9, wherein the fluid thermal medium includes gaseous nitrogen.

12. The apparatus of claim 11, wherein the fluid thermal medium is air.

13. The apparatus of claim 9, wherein the controller controls the at least one temperature control element in accordance with a PID control algorithm which has the target fluid temperature and the sensor signals as inputs.

14. The apparatus of claim 9 wherein the controller sets the target fluid temperature in accordance with a PID control algorithm which has the target object temperature and the estimated temperature of the object as inputs.

15. The apparatus of claim 9, wherein the controller estimates the temperature of the object using a model of a process by which heat is exchanged between the fluid thermal medium and the object.

* * * * *